United States Patent [19]

Witchey

[11] Patent Number: 5,563,885
[45] Date of Patent: Oct. 8, 1996

[54] METHOD AND SYSTEM FOR PROCESSING MULTIPLE CHANNEL DATA

[75] Inventor: Michael D. Witchey, Sarasota, Fla.

[73] Assignee: Loral Fairchild Corporation, Syosset, N.Y.

[21] Appl. No.: 447,543

[22] Filed: May 24, 1995

[51] Int. Cl.⁶ .............................. H04L 12/56; H04J 3/22
[52] U.S. Cl. ..................... 370/94.2; 370/84; 370/85.6; 370/112
[58] Field of Search ............................ 370/60, 60.1, 94.1, 370/94.2, 94.3, 84, 17, 85.6, 112; 395/200.13

[56] References Cited

U.S. PATENT DOCUMENTS

| | | | |
|---|---|---|---|
| 4,317,195 | 2/1982 | Barberis et al. | 370/94 |
| 4,484,327 | 11/1984 | Hanson | 370/84 |
| 4,494,194 | 1/1985 | Harris et al. | 364/200 |
| 4,538,259 | 8/1985 | Moore | 370/60 |
| 4,612,636 | 9/1986 | Grover et al. | 370/94 |
| 4,654,860 | 4/1987 | Ouimet et al. | 375/4 |
| 4,779,267 | 10/1988 | Limb | 370/94 |
| 5,278,825 | 1/1994 | Wallmeier et al. | 370/60 |
| 5,280,475 | 1/1994 | Yanagi et al. | 370/60 |
| 5,381,407 | 1/1995 | Chao | 370/60 |
| 5,398,241 | 3/1995 | Witchey | 370/84 |
| 5,430,721 | 7/1995 | Dumas et al. | 370/60.1 |
| 5,448,567 | 9/1995 | Dighe et al. | 370/94.2 |
| 5,453,981 | 9/1995 | Kasube et al. | 370/79 |

*Primary Examiner*—Hassan Kizou
*Attorney, Agent, or Firm*—Sterne, Kessler, Goldstein & Fox P.L.L.C.

[57] ABSTRACT

A method and system for scheduling multiple channel data output. A multi-channel data processor stores ATM cells received from a network data input stream in channel FIFOs of a cell buffer. The input interval between cells received at a channel FIFO and the channel FIFO fullness is monitored to determine an optimum cell output interval for each channel. This optimum cell output interval is established such that the rate at which cells are output is substantially constant compared to the input cell rate and drives each channel FIFO fullness towards a nominal value. Optimum cell departure times are then calculated based on the optimum cell output interval for each channel. These optimum cell departure times are sorted and prioritized to create an overall optimum cell transmission schedule. By removing cells from channel FIFOs according to this optimal cell transmission schedule, data returns to the network having a restored temporal sequence in each channel without requiring embedded timing information. Establishing an output rate and sequence which optimizes FIFO fullness and minimizes gaps in the output data, also reduces buffering requirements for downstream network equipment.

17 Claims, 8 Drawing Sheets

CELL DEPARTURE FIFOS

| CHANNEL A | CHANNEL B | CHANNEL C | CHANNEL D |
|---|---|---|---|
| 30 | 30.1 |  |  |
| 25 | 25.1 |  | 30 |
| 20 | 20.1 |  | 24 |
| 15 | 15.1 | 30 | 18 |
| 10 | 10.1 | 20 | 12 |
| 5 | 5.1 | 10 | 6 |
| 0 | .1 | 0 | 0 |

METHOD AND SYSTEM FOR PROCESSING MULTIPLE CHANNEL DATA

BACKGROUND OF THE INVENTION

1. Field of the Invention

The present invention relates generally to asynchronous data transport across a network system. More particularly, the present invention pertains to a method and system for scheduling multiple channel data output to restore timing to the data flow in each channel and to optimize the buffering requirements of each channel.

2. Related Art

Data networks such as LANs (local area networks) and WANs (wide area networks) have become commonplace in contemporary business and industry. Such networks allow communication between data stations in various locations. See, e.g. the LAN systems described by Tangney et al., *Local Area Networks and Their Applications*, (Prentice Hall: UK 1988) and Martin et al., *Local Area Networks Architectures and Implementations*, (Prentice Hall: USA 1989) (both of which are incorporated by reference herein).

A complex local area network or a wide area data network typically involves many independent systems and distant network locations. For example, fiber optic data networks are used to transport customer data within a city or across a continent. Maintaining a consistent reference time between these independent systems and remote portions of such a data network is especially difficult.

In addition, many applications such as constant bit rate (CBR) applications are particularly sensitive to temporal distortions of data. For instance, a constant bit rate is essential in digitized speech and voice communications, circuit emulation, video teleconferencing, and telemetry. In a broadband integrated services digital network (BISDN), asynchronous transport of multi-channel data at constant bit rates throughout a data network is needed to implement video teleconferencing.

Synchronous (clocked) and asynchronous (not clocked) transport modes are known for governing the flow of data through a network. See, e.g., the discussion of synchronous (clocked) and asynchronous (not-clocked) busses discussed in Hennessy, J. L. and Patterson, D. A., *"Computer Architecture: A Quantitative Approach,"* Morgan Kaufmann Publishers (San Mateo, Calif.), 1990, and in U.S. Pat. No. 4,494,194 issued to Harris et al. (both of which are incorporated by reference herein). In synchronous systems, a separate clock control line is required. All data must be run at the same clock rate. Clock skew further limits the length of the network data bus. Synchronous schemes are thus best suited for well-defined, short-distance data communication applications such as a CPU-memory bus.

Under an asynchronous scheme, no separate clock line is used, but self-timed protocols must accompany data transported across the network. In asynchronous transport mode protocols (ATM), timing information is often embedded within a frame format. For instance, the preamble or header field can contain timing stamps or other timing related information to allow the bit rate for outputting data to be established at receivers downstream in the data network regardless of cell clumping or the particular input data rate. In this manner, a cell receiver can adapt to a variety of input data rates. Reserving bits for timing information, however, increases overhead and reduces data transmission efficiency.

In asynchronous transport mode, cells of data can also arrive in "bursts." Greater buffering capacity is then required to accommodate the irregular data transmission. Gaps can also occur between packets and the channel data therein which leads to further delay and temporal distortion of network data.

Unlike ATM applications, packet switching technology uses large channel packets rather than individual cells of data. Multiplexers are used to send channel packets from multiple channels between a source and destination node of a network. Demultiplexers then separate the channel packets into their respective separate channels.

In such packet switching technology, a constant output rate has been established without using timing stamps in an asynchronous demultiplexer for a packetized multiple channel data stream. See, the U.S. Pat. No. 5,398,241 issued to applicant on Mar. 14, 1995, and incorporated herein by reference. In the '241 patent, the slower output bit rate for 2048-bit packets of information from the demultiplexer is generated based on the packet arrival frequency for each channel and the output FIFO fullness for that channel. In the context of a packet demultiplexer, however, the output of a data channel is effectuated independent of the other channels. Coordination or scheduling in the data output between channels is not relevant in the '241 patent demultiplexer environment.

What is desired, then, is a multi-channel asynchronous data transport system and method which can schedule data output between channels while still allowing each channel to adapt to variable input data rates and to provide a substantially constant bit rate output. This constant bit output rate needs to be obtained regardless of preceding temporal distortion in the data network, i.e. "cell clumping," and without requiring cells to carry time stamps or other timing information.

In addition, it is desirable to reduce the occurrence of gaps in the multiple channel data stream and to lower system buffering requirements.

SUMMARY OF THE INVENTION

The present invention is an improvement in the asynchronous transport of multiple channel data in cells over a network. In the present invention, a schedule is determined for restoring a substantially constant output rate to the data flow in each channel. Transporting data according to the schedule further reduces gaps in data among the multiple channels and optimizes the buffering capacity required to buffer each channel of data. To reconstruct an original timing of the cells in each channel of the asynchronous transport network, the output rate can be set at a predetermined rate.

According to the present invention, a multiple channel data processor generates a schedule for governing the transport of data cells into an output data stream. The multiple-channel data processor stores temporally distorted cells from a network data input stream in queues or FIFOs of a cell buffer.

A processor monitors the interval between received cells in a channel and each channel's FIFO fullness to determine an optimum cell output interval. Optimum cell departure times are then calculated based on the optimum cell output interval for each channel. These optimum cell departure times are sorted and prioritized to create an overall optimum cell transmission schedule.

According to the present invention, by following this optimal cell transmission schedule, data is output at a substantially constant output rate in each channel back into a data output stream. To reconstruct an original cell timing, this substantially constant rate can be made equal to an original predetermined data rate. Further, the optimum cell output interval, or equivalently, the cell output rate, can be selected to drive the fullness of each channel FIFO towards a nominal value.

In this manner, the present invention recovers timing for constant bit rate cells without requiring the cells to carry time stamps or other timing information.

In addition, the effects of cell clumping and other types of temporal distortion, which occur upstream in the network are removed. The present invention, therefore, ensures that temporally-sensitive CBR applications can continue being processed with less delay in the data network and with less buffering requirements.

Further features and advantages of the present invention, as well as the structure and operation of the embodiment of the present invention, are described in detail below with reference to the accompanying drawings.

BRIEF DESCRIPTION OF THE FIGURES

The present invention is now described with reference to the figures where like reference numbers indicate like elements. In addition, the left-most digit of each reference number indicates the figure in which the number is first used.

DETAILED DESCRIPTION OF THE PREFERRED EMBODIMENT

I. Overview and Discussion of the Invention

The present invention provides a multi-channel data processing method and system for scheduling output data to restore a temporal sequence to the data flow in each channel and to optimize the buffering requirements of each channel.

Throughout this document, the terms "FIFO" and "queue" will be used interchangeably to reference the data structure used to buffer input and output data in each channel in the cell buffer. "Cell" or "data" refers to data transported according to an asynchronous transport mode (ATM).

A multi-channel data processor stores cells from a network data input stream in channel FIFOs in a cell buffer. For each channel, a timing recovery processor monitors the interval between the received cells and the fullness of channel FIFO to determine an optimum cell output interval. Optimum cell departure times are then calculated based on the optimum cell output interval for each channel. These optimum cell departure times are sorted and prioritized to create an overall optimum cell transmission schedule.

By following this optimum cell transmission schedule, data cells are output from channel FIFOs back into a data output stream with a restored temporal sequence suitable for constant bit rate applications, without requiring the cells to carry time stamps or other timing information. This restored temporal sequence means the interval between output cells within each channel is substantially regular compared to their temporally distorted arrival at the multi-channel data processor. Further, the optimum cell transmission schedule can restore a temporal sequence such that the original timing between cells in the channels is reconstructed. The buffering requirements for downstream network equipment can also be reduced by scheduling the cells to remove gaps and optimize the channel FIFO fullness at a nominal value.

2. Example Environment

The present invention is described in the example environment of a multi-channel data processor for scheduling ATM cells in constant bit rate applications. In the example environment, the multi-channel ATM data processor is installed within a data network.

The multi-channel ATM data processor receives and buffers ATM cells for n distinct channels. The processor then returns n channels of constant bit rate CBR data to the data network. For example, up to 16 channels can be combined onto an ATM trunk. Moreover, a wide dynamic range of data rates can be accommodated, including common data bit rates between 256 kbits/sec and 10 Mbits/sec.

Figure 7:
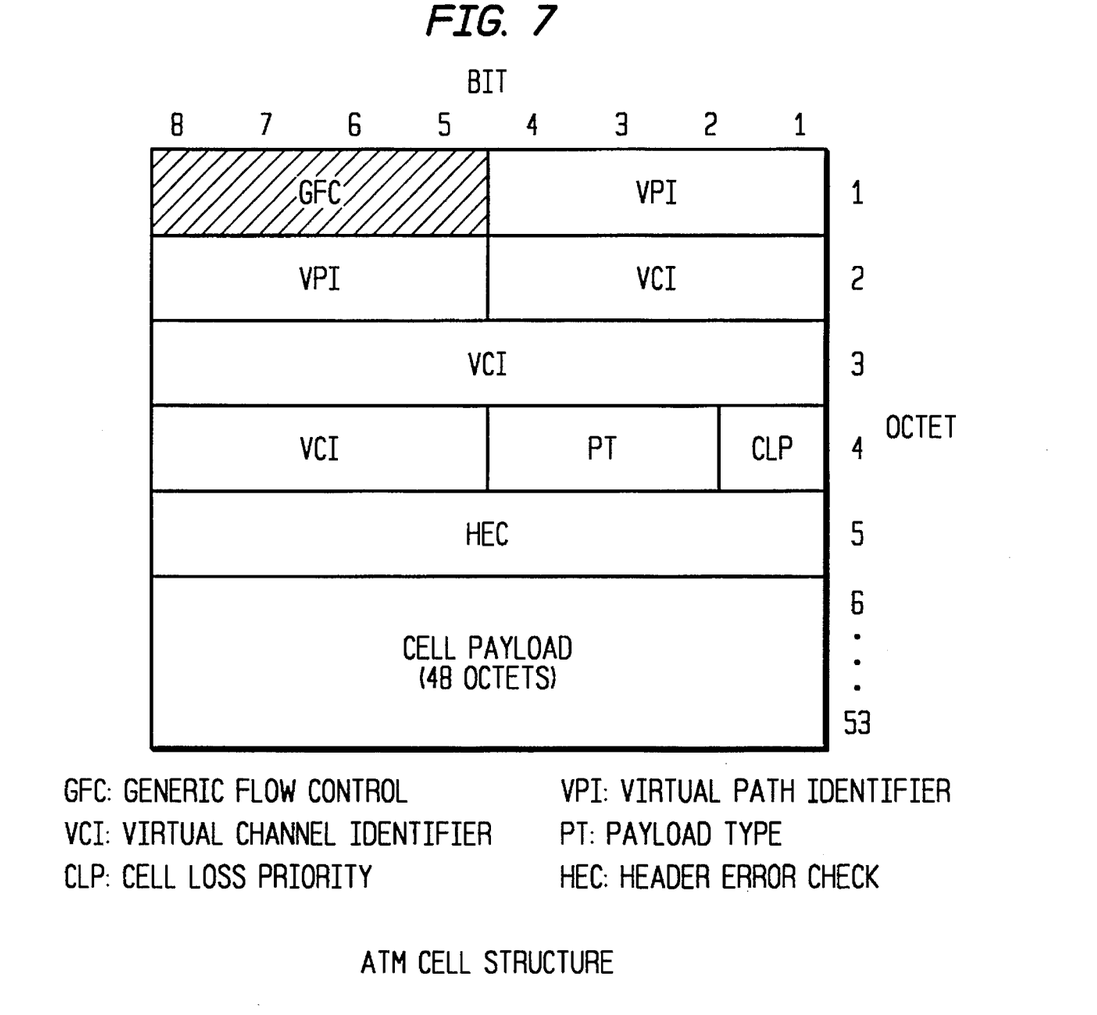
FIG. 7 shows an example of an ATM cell for use in the present invention.

FIG. 7 depicts an example of a known 53 octet ATM cell structure suitable for carrying data across a communication trunk, i.e. T1-type trunk. The first five octets of data serve as the ATM layer header for governing the transport of the cell payload. These first five octets are further divided into the following data fields: Generic Flow Control (GFC), Virtual Path Identifier (VPI), Virtual Channel Identifier (VCI), Payload Type (PT), Cell Loss Priority (CLP), and Header Error Check (HEC).

The VPI and VCI fields are often used together to provide 24 bits for identifying a data channel. Where it is only necessary to identify a path, the 8-bit VPI field can be utilized separately. The 3-bit PT field is reserved for communications internal to a data network, while the 1-bit CLP field allows a higher-grade service guarding against cell loss. The HEC field enables the header to be checked for bit errors, as in a cyclic redundancy check. As a practical matter, the GFC field is often not implemented as indicated by the cross-hatching in FIG. 7.

The cell payload carries 48 octets of data according to the particular underlying communications protocol. For example, in constant bit rate environments such as circuit emulation, video, and telemetry applications, data in the cell payload can follow an AAL1-ATM Adaption Layer 1 protocol. Alternatively, IP communication between remote nodes in a land-based environment can adhere to the known AAL5 protocol. Other communications protocols can also be implemented in an ATM cell structure as would be apparent to one skilled in the art.

The present invention is described in terms of this example ATM communications environment involving constant bit rate applications, such as circuit emulation, video services, and telemetry. Description in these terms is provided for convenience only. It is not intended that the invention be limited to the applications in this example environment. In fact, after reading the following description, it will become apparent to a person skilled in the relevant art how to implement the invention in alternative environments.

Multi-channel CBR data processor for ATM applications

Figure 1:
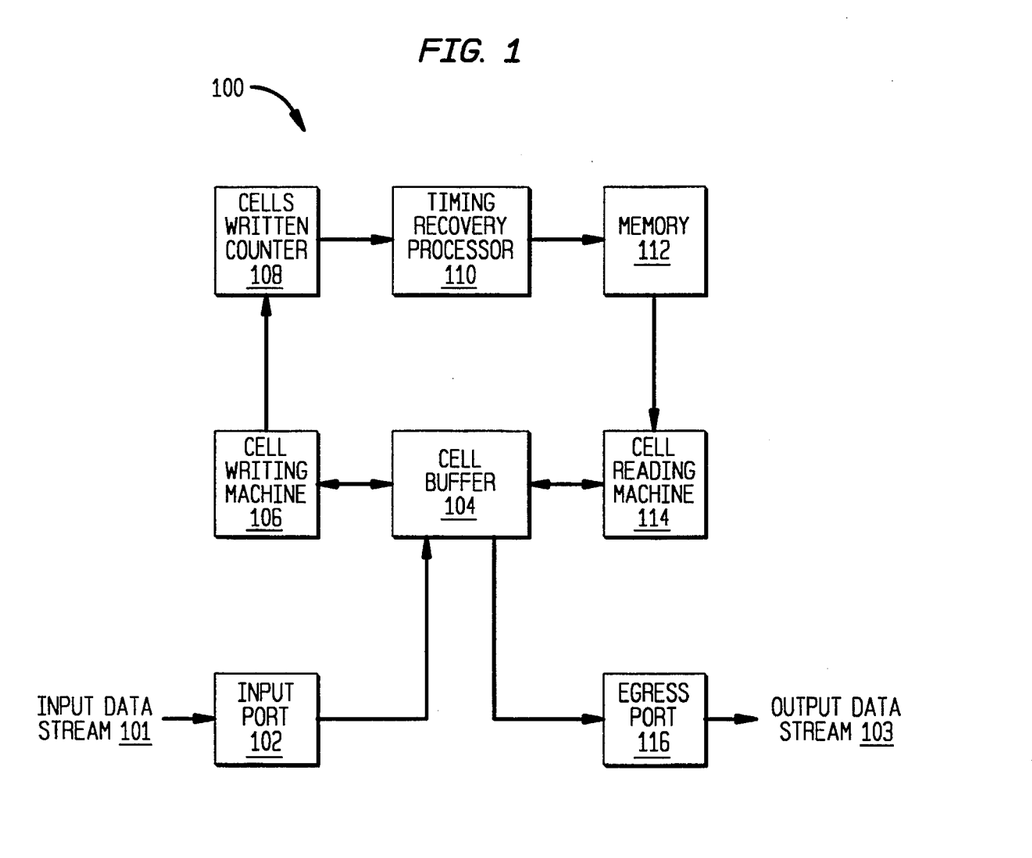
FIG. 1 is a block diagram of a multi-channel constant bit rate data processor according to the present invention.

FIG. 1 is a block diagram of a multi-channel constant bit rate data processor 100 according to one embodiment of the present invention. Multichannel processor 100 includes an input port 102, a cell buffer 104, a cell writing machine 106, a cells written counter 108, a timing recovery processor 110, a memory 112, a cell writing machine 114, and an egress port 116. Multi-channel data processor 100 can be implemented through software and/or hardware as would be apparent to one skilled in the art in view of the description provided herein.

Multi-channel processor 100 processes two streams of ATM cells, an input data stream 101 and an output data stream 103. The data streams operate independently. Data is shared between the data streams via cell buffer 104. Input data is stored in cell buffer 104 upon receipt. Data is output from cell buffer 104 according to an optimum cell transmission schedule created by timing recovery processor 110 into the output data stream 103. Each data stream is discussed below.

Input Data Stream

Figure 2:
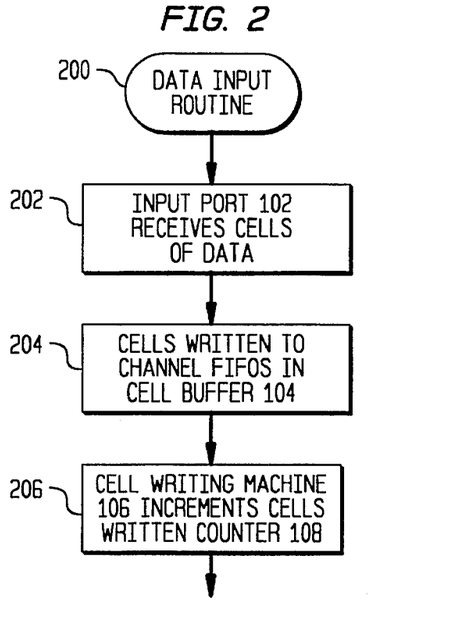
FIG. 2 is a flow chart illustrating the data input routine according to the present invention.

The processing of the input data stream by data processor 100 is described below with reference to the data input routine 200 in FIG. 2. In step 202, input port 102 receives an input data stream 101 having temporally distorted blocks of data, i.e. ATM cells as shown, for example, in FIG. 7.

These ATM cells are received from n multiple channels of a data network. For example, four channels of data can be processed and scheduled.

Typically, the timing relationship between the cells has been temporally distorted at intermediate stops in the data network. This temporal distortion, called cell clumping, is caused by buffering and delays inherent in data networks.

In step 204, the cells received at input port 102 are written to corresponding channel FIFOs in cell buffer 104. Cell buffer 104 provides a channel FIFO for each channel of the data network. Each cell is then stored in the channel FIFO of cell buffer 104 that corresponds to the channel of the data network from which the cell was received.

Cell writing machine 106 controls the storing of data to cell buffer 104. Cell writing machine 106 identifies the channel of each cell received by input port 102 and stores the received cell in the appropriate channel FIFO of cell buffer 104.

The nominal length of each channel FIFO of cell buffer 104 is determined from the extent of cell clumping in the data network. In a preferred embodiment, the nominal FIFO length is two to four times the expected temporal distortion of a channel. For example, if a channel typically clumps 100 cells, the nominal FIFO length should be 200 to 400 cells.

The allowable transmission delay for turning around data is proportional to the nominal buffer length. For example, if a channel receives a 3 Mbit/sec video stream, each cell being 53 bytes long, and the nominal FIFO length is 300 cells, then the transmission delay is approximately 42.4 microseconds ((300 cells * 53 bytes/cell * 8 bits/byte)/$3 \times 10^6$ bits/sec). If this delay is too long then the nominal FIFO length must be reduced.

Finally, cell writing machine 106 increments a cells written counter 108 (step 206). In particular, cell writing machine 106 increments a cells written counter 108 for each FIFO when a cell is written to that channel FIFO. The number of cells written in each channel FIFO is monitored by timing recovery processor 110 to calculate cell departure times.

Output Data Stream

Figure 3:
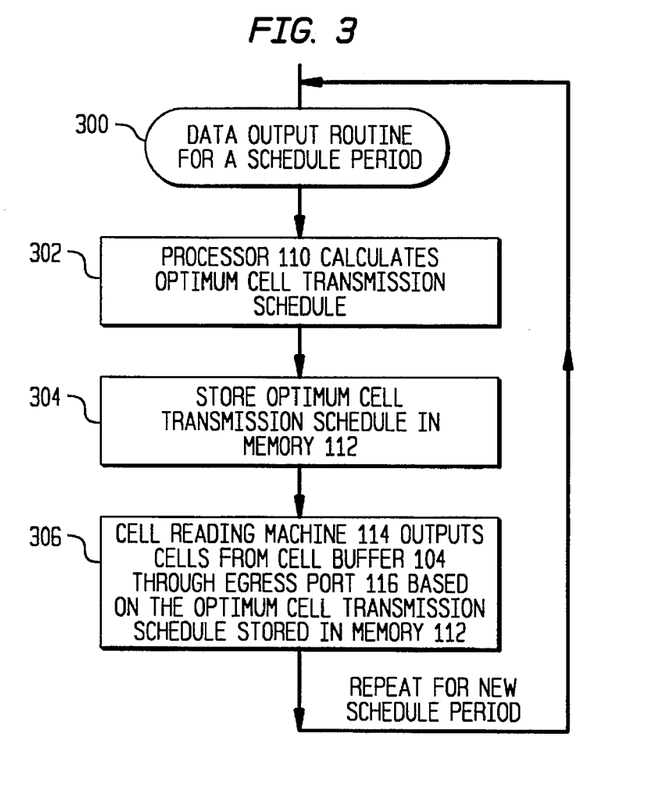
FIG. 3 is a flow chart illustrating the data output routine according to the present invention.

The operation of the output data stream of data processor 100 is described below with reference to FIG. 3. In particular, timing recovery processor 110 executes Data Output Routine 300 to generate an optimum cell transmission schedule for each schedule period. The optimum cell transmission schedule identifies the sequence of cells stored in the n channel queues which are to be output through egress port 116 during one schedule period. The schedule period has a duration equal to a predetermined number of egress cell times, i.e. 32 egress cell times.

In step 302, timing recovery processor 110 calculates an optimum cell transmission-schedule. This optimum cell transmission schedule is then stored in memory 112 (step 304).

In step 306, cell reading machine 114 outputs cells from cell buffer 104 through egress port 116 based on the optimum cell transmission schedule stored in memory 112. The Data Output Routine 300 is then repeated to output additional frames of cell data in a new schedule period.

In this manner, cells are output from the multi-channel data processor 100 with their temporal characteristics restored. The output data follows the optimum cell transmission schedule and is thus suitable for constant bit rate multi-channel applications and efficient processing.

Optimum Cell transmission Schedule

Figure 4:
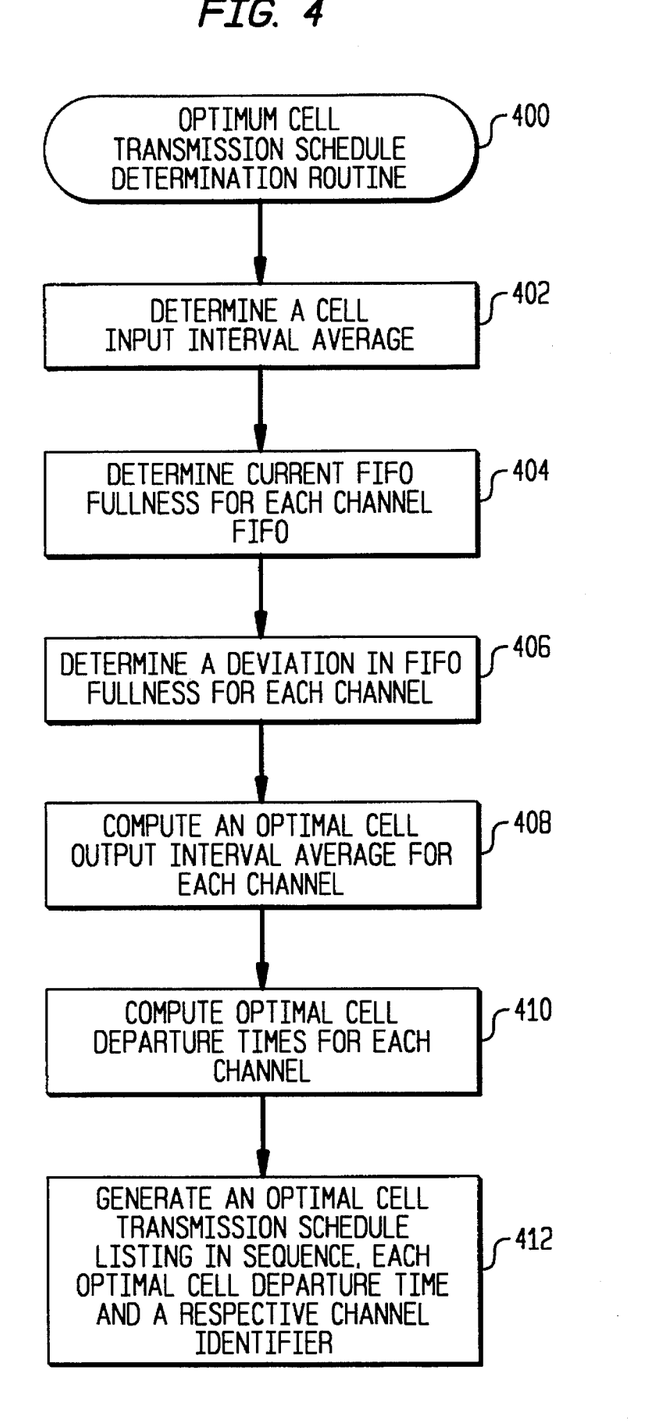
FIG. 4 is a flow chart illustrating the determination of an optimum cell transmission schedule according to the present invention.

One embodiment for determining the optimum cell transmission schedule is shown in FIG. 4. Thus, the routine illustrated in FIG. 4, constitutes one method for implementing step 302 with timing recovery processor 110 according to the present invention.

First, in step 402 the average time interval (cell input interval average) between cells received at the cell buffer 104 is determined. The cell input interval average is calculated for each channel FIFO by dividing the schedule length by the number of cells received during the schedule time period. As would be apparent to a person skilled in the art, this step can be avoided by using a predetermined constant for the interval average representing an original timing. The general case where a cell input interval average is calculated or updated for each schedule determination, however, is preferred.

For example, if the schedule length equals 32 cell egress times and 8 cells are received during the schedule period, the interval between two cell packets received from the input data stream 101 on average during that schedule period would equal 4 cell egress times. Accordingly, if each egress cell time is approx. 10 μsec as in the 3 Mbit/sec videostream described earlier, the interval average would be approx. 40 μsec.

The calculated cell input interval average is significant as it represents the inverse of the rate in which cells are entering the cell buffer 104. Thus, the interval average indicates what optimum output rate is necessary to efficiently process data through the processor without overrunning or underrunning the cell buffer 104.

A further step of filtering can also be performed to obtain a final input interval average value. Thus, in the above example, the quotient of the schedule length divided by the number of cells received may be further filtered. Such filtering can include averaging the quotient with a previous interval average to avoid large fluctuations in the interval average and to maintain a more even output rate over time from the data processor 100. For instance, a simple, recursive low pass digital filter can be implemented with relatively low data storage requirements. Other filters would be apparent to one skilled in digital filtering.

Next, in step 404, the current FIFO fullness, that is the amount of cells presently stored on a channel FIFO, is determined. In particular, timing recovery processor 110 calculates the current FIFO fullness for each channel FIFO by adding the number of cells received at the channel FIFO during the current schedule period to the previous FIFO fullness value, that is the time, if any, when the FIFO fullness was last determined. The number of cells transmitted from the FIFO since the time the FIFO fullness was last calculated is then subtracted to obtain an updated value of the FIFO fullness for each channel.

Input and output counters can be used for each channel FIFO to record the insertion and removal of the cells from the FIFOs. Moreover, as is well-known, start and end address pointers can be used to track the top and bottom of a FIFO and, as result, the FIFO fullness or queue length.

In step 406, a deviation in the current FIFO fullness from a nominal FIFO fullness is determined. In particular, the deviation in FIFO fullness is calculated by simply subtracting a predetermined nominal FIFO fullness value from the current FIFO fullness determined in step 404.

As with the cell input interval average of step 402, a further filtering step can be performed on the deviation to obtain a more sophisticated final deviation value. Such filtering can include averaging the deviation with a previous deviation to avoid large fluctuations and to maintain a more even output rate over time from the data processor 100. Preferably, the filtered deviation value is also normalized by dividing by the nominal FIFO fullness.

In step 408, an optimal cell output interval average is computed to optimize the output rate of cells based on the input rate of cells into the cell buffer 104 and the deviation of FIFO fullness from the nominal FIFO fullness. Nominal FIFO fullness is a parameter based on the quality of service and the desired performance of the specific cell buffer application.

Specifically, in step 408 a check is first made to determine if the deviation determined in step 406 is a positive value. If so, an optimum cell output interval average is calculated to increase the output cell rate, i.e. reduce the interval between cells being output, so as to drive cells out of the cell buffer 104 at a greater rate than are being input. In other words, when the FIFO fullness exceeds nominal fullness, the optimal cell output interval is reduced compared to the cell input interval average to drive the FIFO fullness towards the nominal FIFO fullness.

In addition, the magnitude of the reduction of the optimal cell output interval average compared to the cell input interval average can be a predetermined constant. Alternatively, the magnitude of the reduction in the optimal cell output interval average can be made a function of or proportional to the magnitude of the deviation. In this way, the cell output rate is increased more substantially for greater differences between the FIFO fullness and the nominal FIFO fullness. Given the above description, other ways of selecting a particular optimal cell output interval average based on the detected positive deviation and the cell input interval average would be apparent to one skilled in the art.

Lastly, with regards to step 408, a negative deviation can be detected indicating the channel FIFO is relatively empty compared to its nominal FIFO fullness. In this case, no changes in the optimal cell output interval average are necessary. Alternatively, to further optimize performance of other channels, the optimal cell output interval average can be increased to allow other more full channel FIFOs to output data more quickly.

In step 410, optimal cell departure times are calculated for each channel based on the optimal output cell interval average computed in step 408. In particular, optimal cell departure times are determined by multiplying an incremental integer sequence by the optimal output cell interval average until product is as long as the schedule length. For example, if the schedule length is 32 egress cell times and the optimal output cell interval average for a channel equals 2 cell times, 16 equidistant optimal cell departure times are computed for that particular channel. Similar calculations are then performed for each channel based on the specific optimal output cell interval average for the respective channel.

Finally, in step 412, an optimal cell transmission schedule is generated by sorting in chronological sequence each optimal cell departure time, as calculated in step 410. An associated channel identifier accompanies these sorted cell departure times. Because the departure times for each channel are calculated independently, channels can have identical cell departure times. For example, to remove the conflict between departure times having the same integer magnitude stored in the different cell departure FIFOs, the fractional parts of the times are also sorted. In this case, a cell departure time of 30.1 would be sorted to follow a cell departure time of 30.

The channels can be further prioritized or provisioned relative to each other to son identical cell departure times or to give preferential treatment to selected channels. For example, in a four channel system, channel A can be prioritized over channel B, channel B over channel C, and Channel C over channel D. Thus, if channel A and channel B both have times equal to 30.0, channel A will be sorted to precede channel B.

Example of Optimum Cell Transmission Schedule

Figure 5A:
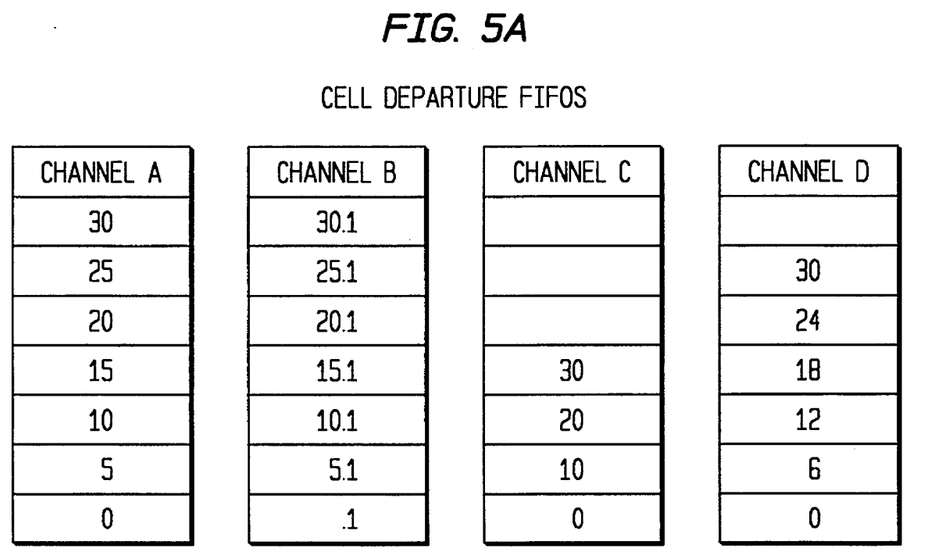
FIG. 5A shows an example of the optimum cell departure times stored in cell departure FIFOs in a four-channel synchronizer according to the present invention.

The generation of an optimum cell transmission schedule will now be explained with regards to the specific example shown in FIGS. 5A and 5B. FIG. 5A shows an example of the contents of four cell departure time FIFOs corresponding to four channels A to D respectively. Each cell departure FIFO contains cell departure times as calculated in step 410 for a schedule period or length of 32 egress times.

Accordingly, during the schedule period, channels A, B, C, and D have optimal cell output interval averages of 5, 5, 10, and 6 egress cell times, respectively. These output interval averages are determined as described before with respect to step 408. Optimal cell output departure times corresponding to these optimal cell output interval averages are thus stored in the cell departure time FIFOs as shown in FIG. 5A. Thus, the departure time FIFO for channel A contains the departure times 0, 5, 10, 15, 20, 25, and 30. The departure time FIFO for channel B contains the departure times 0.1, 5.1, 10.1, 15.1, 20.1, 25.1, and 30.1. Similarly, the departure time FIFO for channel C contains the departure times 0, 10, 20, and 30. The departure time FIFO for channel D contains the departure times 0, 6, 12, 18, 24, and 30.

Figure 5B:
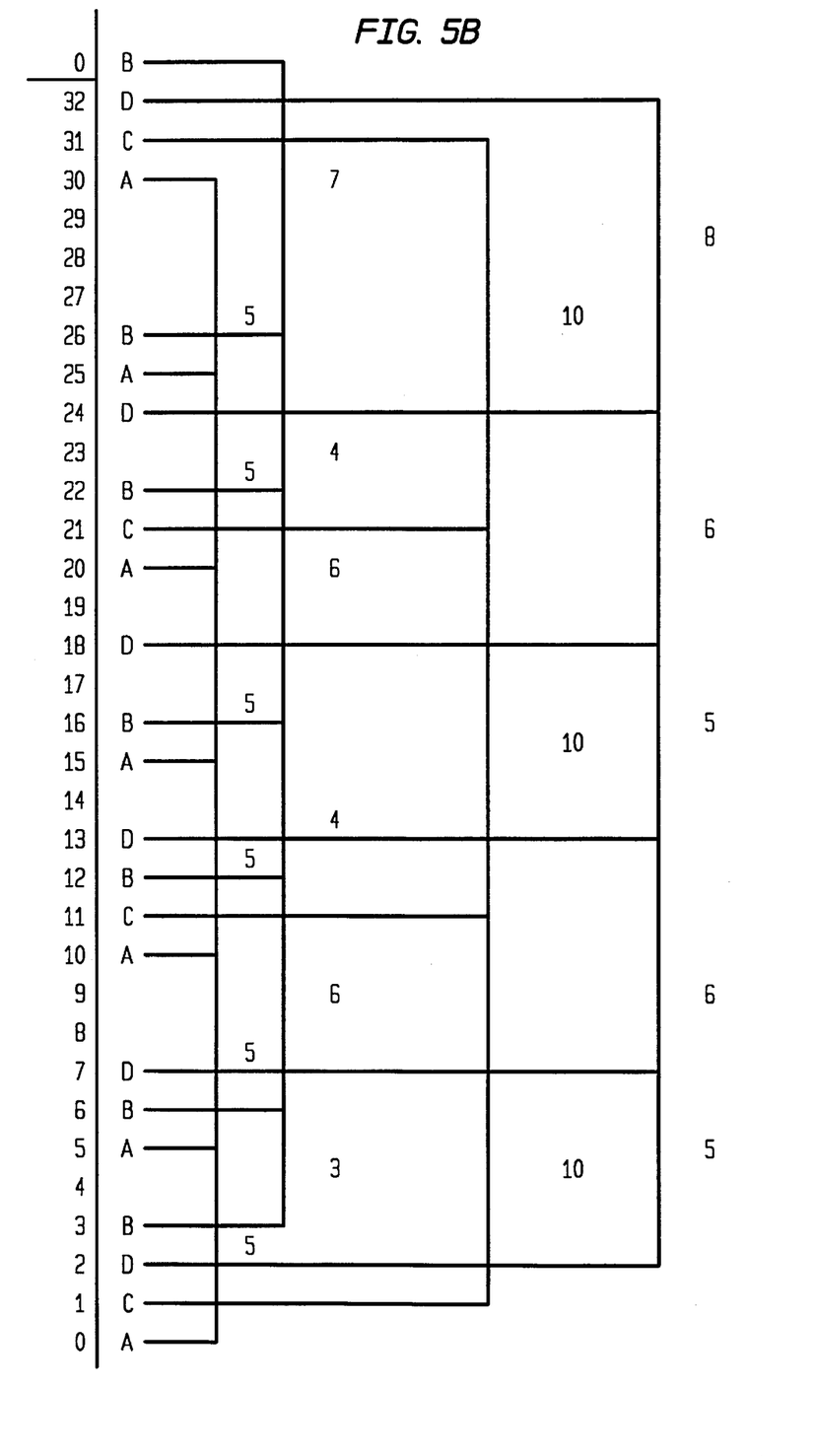
FIG. 5B shows an example of an optimum cell transmission schedule according to the present invention generated from the cell departure times in the FIFOs of FIG. 5A.

FIG. 5B shows an optimal cell transmission schedule generated from the cell departure time FIFOs shown in FIG.

5A. The schedule lists the channel identifier of each channel to be sent during the schedule period.

To generate the schedule, the cell departure times in each FIFO were first sorted by the magnitude of their integer part. For cell departure times with identical integer values, a further sort of the remaining fractional part of cell departure times was then performed. Identical times such as 0 and 30 were further prioritized by channel with channel A getting precedence over channel B and so forth. These sort routines are provided as examples. Other sort routines can be implemented as would be apparent to one of ordinary skill in the art.

As described above with respect to step 304, this schedule can then be stored in memory 112. Cells are then read out from the channel FIFOs in the cell buffer 104 according to the sequence of channels identified in the optimal cell transmission schedule. For example, the cell reading machine 114 first initializes a counter and then reads the channel identifier at the first entry of the schedule. The Cell Reading Machine 114 then reads and retrieves a cell from the corresponding channel FIFO in the Cell Buffer 104. This cell is then transmitted to the Egress Port 116. The counter can then be incremented and the next table entry will be read. This cycle continues until the entire schedule has been read, i.e. when the counter reaches the schedule length.

As shown in FIG. 5B, outputting cells according to the optimal cell transmission schedule restores temporal characteristics of the cell data as it enters the output data stream 103. In other words, the cells in each channel are output with substantially even spacing. For instance, cells in channel A have a consistent interval of five egress cell times. Cells are separated by 10 egress cell times in channel C. In channel B, the interval between cells is between 3 and 7. In channel D, the interval is between 5 and 8.

At the Egress Port 116, cells can be sent directly to the output data stream 103 or, preferably, buffered in a buffer memory (not shown). As would be readily apparent to one skilled in the art, a further Egress Buffer Memory Manager can control the buffering of the cells at the Egress Port.

Figure 6A:
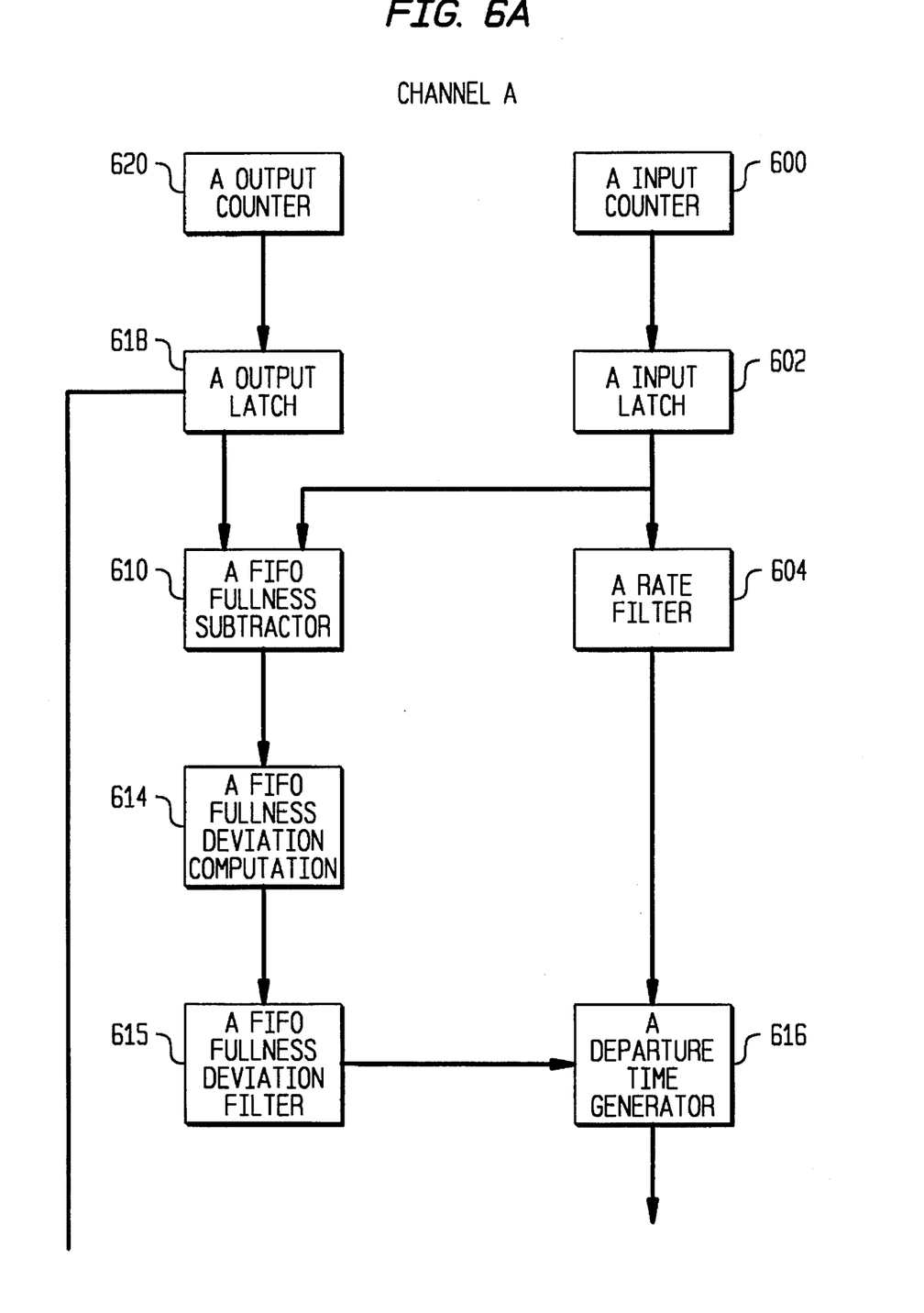
FIGS. 6A and 6B are schematic diagrams of a four-channel constant bit rate data processor implemented according to the present invention.
Figure 6B:
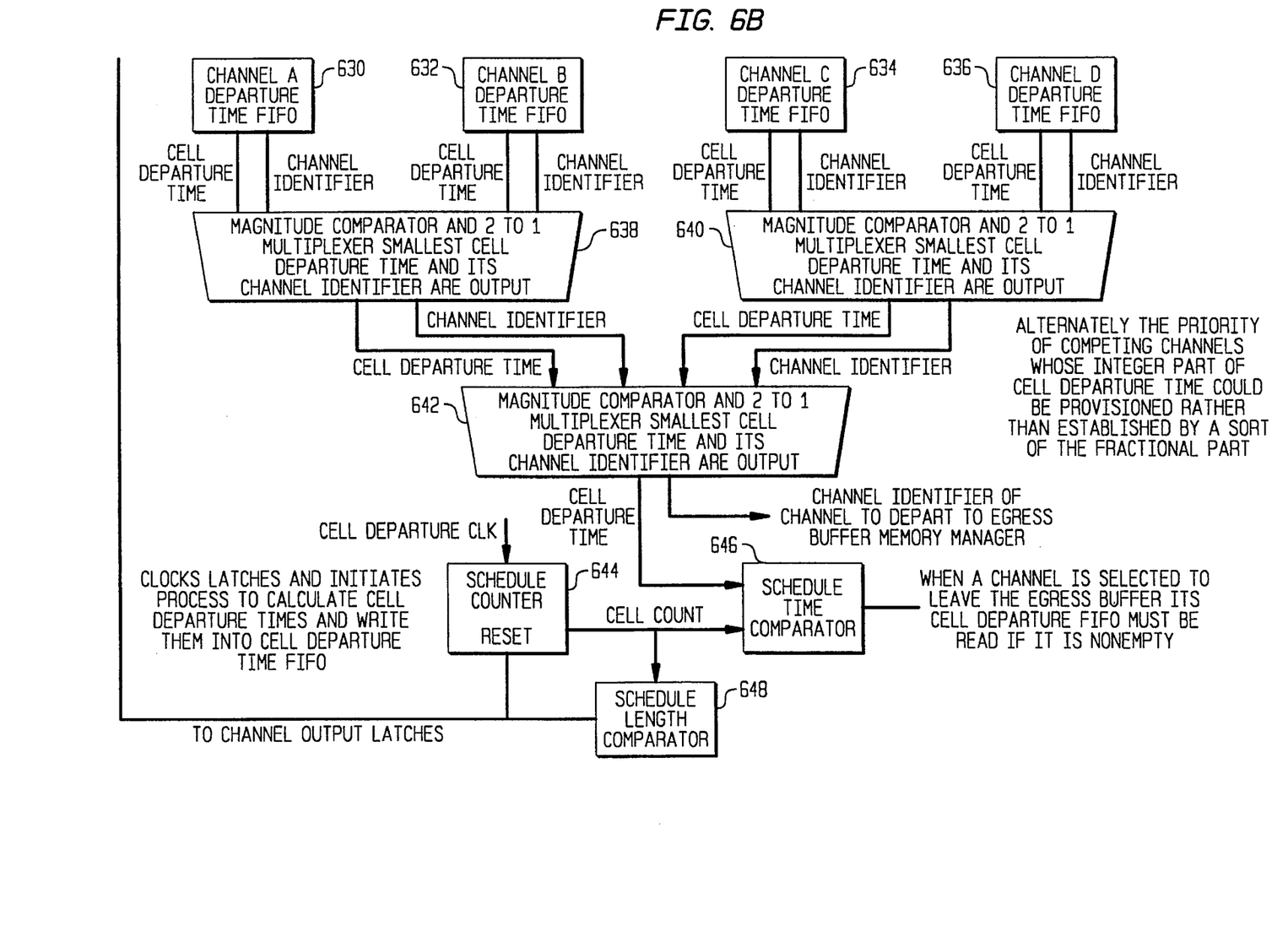

FIGS. 6A and 6B further show with more detail a specific four-channel implementation of a multi-channel data processor according to the present invention. Input cells in four channels A to D are processed identically to obtain cell departure times. Accordingly, in FIG. 6A it is only necessary to describe channel A in detail, as the operation of the other channels B to D would be clear to one of ordinary skill in the art.

FIG. 6A shows in schematic form a timing recovery processor for generating cell departure times in channel A. Identical processing (not shown) is performed to generate cell departure times for cells in channels B to D.

As shown in FIG. 6A, an input latch 602 is provided for latching input cells in channel A to a queue or channel A FIFO (not shown) for storage. An input counter 600 is connected to the input latch for counting the number of cells written. Similarly, an output latch 618 latches cell read from the channel A FIFO to an output data stream. An output counter 620 maintains a count of the cells read out.

Channel A rate filter 604 is connected to the channel A input latch 602 for filtering the input rate of cells into the channel A FIFO as discussed with respect to FIG. 4.

Channel A FIFO fullness subtractor 610 subtracts the number of cells received from the number of cells transmitted to determine the channel A FIFO fullness. The FIFO fullness deviation for the channel A FIFO is then computed by a calculator 614 as described previously with respect to FIG. 4.

A FIFO fullness filter 615 filters and normalizes the calculated deviation from FIFO fullness for channel A and provides the filtered channel A FIFO fullness deviation to a channel A departure time generator 616. Departure time generator 616 also receives the filtered input rate for channel A from the rate filter 604. As described with respect to FIG. 4, the channel A departure time generator 616 then computes an optimal cell output average for channel A based on the filtered input rate and the filtered FIFO fullness deviation. Next, cell departure times are generated based on the calculated optimum cell output interval average and sent to a channel A cell departure FIFO 630.

As shown in FIG. 6B, channels A to D each have a respective cell departure time FIFO 630, 632, 634, and 636. Each cell departure time FIFO 630, 632, 634, and 636 outputs a cell departure time and a corresponding channel identifier. Three magnitude comparators 638, 640, and 642 are provided for sorting the sequence of cell departure times for the optimum cell transmission schedule.

Magnitude comparator 638 is a two to one multiplexer which further compares channels A and B to determine the smallest departure time. Likewise, magnitude comparator 640 is a two to one multiplexer which further compares channels C and D to determine the smallest departure time. Magnitude comparator 642 then multiplexes and compares the resulting output times of comparators 638 and 640 to determine the smallest departure time between the four channel cell departure time FIFOs.

The final sorted cell departure times are then output from comparator 642 to schedule comparator 646. The corresponding channel identifier passes to an egress memory buffer manager for forming the optimal cell transmission schedule.

A schedule counter 644 responds to a cell departure clock signal generated when a cell is transmitted. In this manner, the schedule counter 644 counts the total number of cells transmitted according to a particular cycle of the optimal cell transmission schedule. The cell count output from the schedule counter 644 passes to schedule time comparator 646 and to schedule length comparator 648.

Schedule time comparator 646 compares the cell departure time and schedule cell count to select the next cell egress time for the egress buffer. Actual cell data is then output during the cell egress time from the channel FIFO identified by the channel identifier output from magnitude comparator 642.

If a cell departure time FIFO is empty, a lower priority cell departure time FIFO is read. If all of the cell departure FIFOs are empty for that egress time, then an empty well will be transmitted.

Finally, schedule length comparator 648 compares the cell count to the schedule period. When the maximum schedule length is reached, i.e. 32 egress cell times, then the schedule counter 644 is reset and the output latches 618 of channels A to D are tripped.

While a preferred embodiment of the present invention has been clearly shown and described above, it should be understood that this is presented by way of example only, and not limitation. It will be understood by those skilled in the art that various changes in form and details may be made therein without departing from the spirit and scope of the invention as defined in the appended claims. Thus, the breadth and scope of the present invention should not be limited by the above-described exemplary embodiment and examples, but should be defined only in accordance with the following claims and their equivalents.

What is claimed is:

1. A system for scheduling multiple channel data for asynchronous transport through a data network comprising:

buffering means for storing and outputting cells of multiple channel data received at varying rates from said network; and processing means for scheduling cells to be removed from said buffering means such that data is output at a substantially constant rate in each respective channel back into said data network, wherein said buffering means comprises a plurality of channel FIFOs having a nominal FIFO fullness and said processing means further includes means for scheduling cells to be removed from said channel FIFOs such that the FIFO fullness of said channel FIFOs are driven toward said nominal FIFO fullness.

2. The system according to claim 1, wherein said processing means further includes means for scheduling cells to be removed from said buffering means such that gaps in said data output in each channel back into the network are reduced compared to gaps in said data input into said buffering means to reduce delay in data transport and to lower buffering requirements for network equipment downstream from said buffering means.

3. The system according to claim 1, wherein said processing means schedules cells to be removed from said buffering means by determining cell departure times for said multiple channels of data and sorting said cell departure times.

4. A system for transporting data in multiple channels comprising:

buffering means for storing data received from said multiple channels, said buffering means including a plurality of channel FIFOs, wherein each channel FIFO stores cells of data corresponding to a respective channel;

processing means for generating a cell transmission schedule identifying a sequence of cells to be removed from said plurality of channel FIFOs: and output means for outputting said cells from said channel FIFOs according to said sequence identified in said cell transmission schedule, wherein said processing means comprises:

means for determining for each channel a cell input interval representative of the average cell input rate of cells received at the channel FIFO;

means for determining for each channel a deviation in current FIFO fullness from a nominal FIFO fullness;

means for determining for each channel a cell output interval, said cell output interval representing an average cell output rate for outputting cells in said channel FIFO to restore a temporal sequence in data output in said channel and to drive the current FIFO fullness of said channel FIFO towards said nominal FIFO fullness;

means for determining cell departure times for each channel based on said respective cell output interval and the number of cells in each channel FIFO; and means for sorting said cell departure times to generate said cell transmission schedule.

5. The system according to claim 4, wherein said means for determining a cell input interval for each channel includes counters for counting the number of cells input during a schedule time period and means for dividing said number of cells inputted by said schedule time period.

6. The system according to claim 4, wherein said means for determining a cell input interval further includes means for filtering the input cell rate for each channel.

7. The system according to claim 4, wherein said means for determining a deviation includes means for determining current FIFO fullness comprising:

input and output counters for counting the number of cells input and output respectively from said channels FIFOs, a subtractor for subtracting the number of cells output from the number of cells input to determine the net number of cells inserted on each channel during a schedule period, and an adder for adding a previous FIFO fullness value, if any, based on said net number of inserted cells to determine said current FIFO fullness.

8. The system according to claim 4, wherein said means for determining a deviation further includes means for determining and filtering the current FIFO fullness for each channel.

9. The system according to claim 4, wherein said means for determining a cell output interval includes means for filtering said deviation for each channel.

10. The system according to claim 4, further comprising a plurality of cell departure time FIFOs corresponding to said channel, each cell departure time FIFO storing said cell departure times for data in a respective channel.

11. The system according to claim 10, wherein said cell transmission schedule comprises a period of cell egress times and said means for sorting said cell departure times comprises means for multiplexing cell departure time and channel identifier information from each cell departure time FIFO, said cell departure times being sorted by magnitude and further prioritized by channel in said multiplexing means and said channel identifiers corresponding to said multiplexed cell departure times being assigned to corresponding egress cell times covering said cell transmission schedule period.

12. The system according to claim 4, further comprising:

an input port for receiving said multiple channel data from an input data stream in said data network and providing said multiple channel data to said buffering means; and wherein said output means includes an egress port for outputting said multiple channel data from said buffering means into an output data stream in said data network.

13. A method for asynchronous transport of multiple channel data through a data network comprising the steps of:

storing cells of multiple channel data received at varying rates from said data network in respective channel FIFOs; and determining a schedule for removing said cells from said channel FIFOs such that said data is output from said channel FIFOS at a substantially constant rate in each respective channel, wherein said schedule determining step further includes the step of scheduling cells to be removed from said channel FIFOs such that the FIFO fullness of said channel FIFOs are driven toward a nominal FIFO fullness.

14. The method according to claim 13 wherein said schedule determining step further includes the step of scheduling cells to be removed from said channel FIFOs such that gaps in said data output in each channel back into the data network are reduced compared to gaps in said data received from said data network.

15. The method according to claim 13 wherein said schedule determining step comprises the step of scheduling cells to be removed from said channel FIFOs by determining cell departure times for each of said cells and then sorting said cell departure times.

16. A method for asynchronous transport of multiple channel data through a data network comprising the steps of:

storing cells of multiple channel data received at varying rates from said data network in respective channel FIFOs; and determining a schedule for removing said cells from said channel FIFOs such that said data is output from said channel FIFOs at a substantially constant rate in each respective channel, wherein said schedule determining step comprises the steps of:

determining for each channel a cell input interval representative of the average cell input rate of cells received at the channel FIFO;

determining for each channel a deviation in current FIFO fullness from a nominal FIFO fullness;

determining for each channel a cell output interval, said cell output interval representing an average cell output rate for outputting cells in said channel FIFO to restore a temporal sequence in data output in said channel and to drive the current FIFO fullness of said channel FIFO towards said nominal FIFO fullness;

determining cell departure times for each channel based on said respective cell output interval and the number of cells in each channel FIFO; and sorting said cell departure times to generate said cell transmission schedule.

17. The method according to claim 16, wherein said schedule determined in said schedule determining step comprises a period of cell egress times and said sorting step comprises the steps of:

multiplexing cell departure times and corresponding channel identifier information, said cell departure times being sorted by magnitude and further prioritized by channel to obtain a sequence of channel identifier information identifying in order in which cells are to be output from said channel FIFOs during said period of cell egress times.

* * * * *